(12) United States Patent
Ballard et al.

(10) Patent No.: US 9,772,043 B2
(45) Date of Patent: Sep. 26, 2017

(54) FUEL TANK VENT AND SHUTOFF VALVE

(71) Applicant: Flomax International, Inc., Springville, UT (US)

(72) Inventors: Mark Paul Ballard, Pleasant Grove, UT (US); Carl Paul Ballard, Lindon, UT (US); John Trent Kendrick, Mapleton, UT (US)

(73) Assignee: FLOWMAX INTERNATIONAL, INC., Springville, UT (US)

( * ) Notice: Subject to any disclaimer, the term of this patent is extended or adjusted under 35 U.S.C. 154(b) by 9 days.

(21) Appl. No.: 14/571,145

(22) Filed: Dec. 15, 2014

(65) Prior Publication Data

US 2015/0165897 A1 Jun. 18, 2015

Related U.S. Application Data

(60) Provisional application No. 61/915,920, filed on Dec. 13, 2013.

(51) Int. Cl.
*F16K 21/18* (2006.01)
*F16L 37/34* (2006.01)

(52) U.S. Cl.
CPC .............. *F16K 21/18* (2013.01); *F16L 37/34* (2013.01); *Y10T 137/3099* (2015.04)

(58) Field of Classification Search
CPC ..... F16K 21/18; F16L 37/34; Y10T 137/3099
USPC ........... 141/198, 202; 137/512, 512.3, 513.3, 137/513, 513.7
See application file for complete search history.

(56) References Cited

U.S. PATENT DOCUMENTS

| | | | |
|---|---|---|---|
| 2,094,951 A | * | 10/1937 | Kowan ............... F04B 39/1013 137/512 |
| 3,561,465 A | | 2/1971 | De Graaf |
| 6,837,262 B2 | | 1/2005 | Cortez et al. |
| 7,757,709 B2 | | 7/2010 | Cortez |
| 8,042,564 B2 | | 10/2011 | Ando et al. |
| 9,458,006 B2 | * | 10/2016 | Quang ................... B67D 7/465 |
| 2010/0319787 A1 | | 12/2010 | Hirata |

OTHER PUBLICATIONS

PCT/US2014/070408, International Search Report and Written Opinion, Mar. 31, 2015.

* cited by examiner

*Primary Examiner* — Michael R Reid
*Assistant Examiner* — Patrick Williams
(74) *Attorney, Agent, or Firm* — Kunzler Law Group

(57) ABSTRACT

A non-pressure valve is provided, and includes a tubular housing having an inlet and an outlet, and a flow-through support mount disposed in the outlet. The non-pressure valve also includes a poppet slideably coupled with the flow-through support mount and extending towards the inlet, and an outlet fitting extending through the flow-through support mount and the first poppet, the outlet fitting forming a slide guide for first poppet. The non-pressure valve also includes a sliding bell disposed around a portion of the first poppet and configured to slide independently of the first poppet. The non-pressure valve functions to divert a portion of the fuel flow through a hose to the remote fuel vent.

8 Claims, 5 Drawing Sheets

FUEL TANK VENT AND SHUTOFF VALVE

CROSS-REFERENCES TO RELATED APPLICATIONS

This application claims the benefit of and claims priority to U.S. Provisional Patent Application No. 61/915,920 entitled "FUEL TANK VENT AND SHUTOFF VALVE" and filed on Dec. 13, 2013 for Mark Paul Ballard et al., which is incorporated herein by reference.

FIELD

This disclosure relates to fluid transfer devices, and more particularly to a fluid receiver and fuel tank vent for receiving fluid from a nozzle.

BACKGROUND

Fuel receivers for receiving fuel from a fuel source are used for refueling large pieces of equipment, such as construction and mining vehicles, on-site using a mobile refueling source, such as a refueling truck. Generally, the fuel receivers are secured to the equipment in fluid communication with a fuel tank of the equipment. A fuel source includes a hose and a nozzle attached to an end of the hose. When fueling or refueling of the equipment is desired, the nozzle is placed securely over the receiver, a valve of the receiver is opened, and fuel is pumped from the fuel source, through the hose, nozzle, and receiver, to the fuel tank of the equipment. Such receiver and nozzle refueling systems are designed to facilitate efficient and rapid refueling events, that is, attachment of the nozzle, transmission of fuel into the fuel tank, and detachment of the nozzle.

Oftentimes, the fuel tank of large industrial equipment is very large, capable of holding hundreds of gallons of fuel. To efficiently fill such fuel tanks, transfer rates are in the range of 1 to 5 gallons per second. However, determining when to stop the fuel transfer rate so as to not overfill the tank is problematic. Current fuel receivers may take up to 3-5 seconds to stop the flow of fuel, at which time an extra 35 gallons may have flowed into the tank.

SUMMARY

An apparatus for a non-pressure valve assembly is disclosed. In one embodiment, the apparatus includes a tubular housing having an inlet and an outlet, and a flow-through support mount disposed in the outlet. The non-pressure valve also includes a poppet slideably coupled with the flow-through support mount and extending towards the inlet, and an outlet fitting extending through the flow-through support mount and the first poppet, the outlet fitting forming a slide guide for first poppet. The non-pressure valve also includes a sliding bell disposed around a portion of the first poppet and configured to slide independently of the first poppet. The non-pressure valve functions to divert a portion of the fuel flow through a hose to the remote fuel vent.

In one embodiment, the flow-through mount includes a second poppet extending toward the inlet. The first poppet, in one example, is moveable between an open position that allows fluid to flow through the inlet and a closed position that blocks fluid from flowing through the inlet, and the sliding bell is moveable between an open position that allows fluid to flow through the non-pressure valve and a closed position that blocks fluid from flowing through the non-pressure valve.

In one embodiment, the sliding bell moves from the open position to the closed position in response to an increase in backpressure in a hose coupled with the outlet fitting. In another embodiment, the non-pressure valve includes a bleed opening in the first poppet configured to allow fuel to pass from the inlet into the outlet fitting through an interior channel in the first poppet. The sliding bell may cover the bleed opening when the first poppet is in the open position. An opening may be formed between the first poppet and the sliding bell to allow fluid to flow into the bleed opening even when the sliding bell covers the bleed opening.

In one embodiment, the sliding bell is a one-way valve that only allows the flow of fluid from the inlet to the outlet of the non-pressure valve. In one embodiment, the non-pressure valve includes a first spring disposed between the first poppet and the flow-through support mount configured to bias the first poppet, and a second spring disposed between the sliding bell and the flow-through support mount configured to bias the sliding bell.

In other embodiments, a fueling system is provided that couples the non-pressure valve with a remote fuel vent in a non-pressurized fuel tank. The remote fuel vent may include an upper portion mounted to an outer surface of the non-pressurized fuel tank, a lower portion coupled with the upper portion and extending into the non-pressurized fuel tank, a float tube fluidly coupling the upper portion with the lower portion, a float assembly slidingly coupled with the float tube and comprising a float and a bell housing, the bell housing fluidly coupled with the float tube assembly, and a poppet rigidly coupled with a lower end of the lower portion, the poppet disposed within the bell housing.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

The subject matter of the present application has been developed in response to the present state of the art, and in particular, in response to the problems and needs in the art that have not yet been fully solved by currently available fuel receivers. Accordingly, the subject matter of the present application has been developed to provide a fluid receiver that overcomes at least some shortcomings of the prior art.

Described herein are various embodiments of a fueling system capable of automatic shutoff once a predetermined fuel level has been reached inside of a fuel tank. The fueling system, beneficially, reduces the risk of under filling and overfilling, and accordingly, reduces the likelihood of fuel spillage. The fuel system allows for rapid filling of non-pressurized fuel tanks by fluidly connecting a non-pressure fuel shutoff valve (hereinafter "non-pressure valve") and a non-pressure vent. The non-pressure valve is formed having a substantially annular flow path around a poppet and sliding bell that allows for non-turbulent high fuel flow rates into the fuel tank. A portion of the fuel is diverted through a hose to the vent, then through a float tube connected with a bell and a vent poppet, and into the fuel tank. A float attached with the bell detects when the fuel reaches a predetermined fill level and causes a change in the annular flow path between the bell and the vent poppet. Any change in the annular flow path results in the vent poppet forming a seal with the bell, and consequently, the backpressure in the hose causes the non-pressure valve to close, as will be described below in greater detail.

Figure 1:
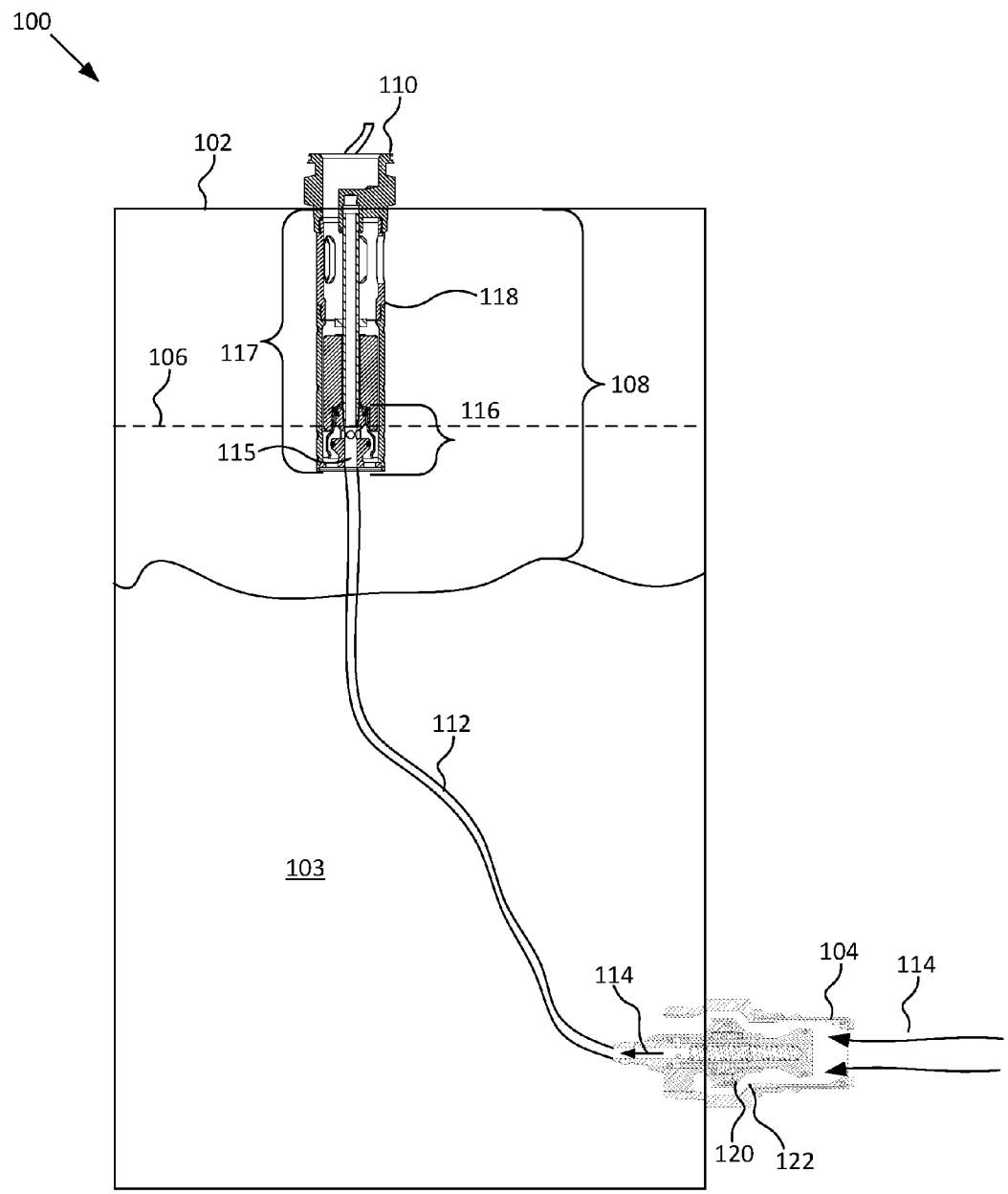
FIG. 1 is a schematic diagram illustrating one embodiment of a fuel system in accordance with embodiments of the invention.

FIG. 1 is a schematic diagram illustrating one embodiment of a fuel system 100 in accordance with embodiments of the invention. The fuel system 100, as depicted, includes a fuel tank 102 that receives fuel 103 through a non-pressure valve 104. Beneficially, the non-pressure valve 104, in one embodiment, is configured to function as a shut-off valve and a fuel receiver. The non-pressure valve 104 is configured to shutoff fuel flow when the fuel level reaches a predetermined fill level 106. The predetermined fill level 106 is selected according to the size of the fuel tank 102 (i.e., dimensions of the fuel tank 102). The unused area of the fuel tank 102 is known as "ullage." In other words, the area between the fuel and the top of the fuel tank is the ullage 108. The ullage 108 is predetermined to allow the fuel 103 sufficient room to expand and contract without overfilling the fuel tank 102. Previously, the amount of ullage 108 required had to take into account the amount of time required to stop flow through a shutoff valve. Current shutoff valves may take up to 1-3 seconds to completely stop fuel flow, which, at high flow rates, may be equivalent to an extra 5-35 gallons of fuel. Beneficially, the described fuel system 100 is capable of substantially instantaneous shutoff of fuel flow. As such, a smaller ullage 108 is required, and more precise filling is accomplished.

A vent 110 allows for the breathing of the fuel tank 102. The vent 110 allows the air of the ullage 108 to escape the fuel tank 102 as fuel 103 fills the tank. As described above, the vent 110 is also fluidly coupled via a hose 112 with the non-pressure valve 104 and configured to cause the non-pressure valve 104 to shutoff fuel flow. While the components of the non-pressure valve 104 and the vent 110 will be described in greater detail below, the method of operation includes diverting a portion of the fuel 103 into the hose 112, as the fuel 103 travels through the non-pressure valve 104, and subsequently into the vent 110. The direction of this diverted portion of fuel is depicted in FIG. 1 by arrows 114. The fuel flows 114 through a float tube 115 in the vent and into a float assembly 116. The float assembly 116 is housed in a float shaft 118 that extends into the fuel tank 102. The length 117 of the float shaft 118 is determined by the desired fill level 106. Stated differently, a longer float shaft 118 results in a larger ullage 108 as compared to a shorter float shaft 118.

When the fuel 103 level reaches the float assembly 116, and causes the float assembly 116 to move upward, the fuel flow through the vent 110 is impeded and the fuel pressure in the hose 112 increases. The increase in pressure in the hose 112 is communicated with the non-pressure valve 104 which pushes a sliding bell 120 that engages a surface 122 of the non-pressure valve and consequently stops the flow of fuel through the non-pressure valve 104.

As depicted, the hose 112 is beneficially disposed within the tank 102 and does not require any external mounts or routing. The system 100 allows for the flow of fuel to continue through the valve, to the vent, and exit in a unidirectional stream around the vent poppet. This single stream allows for the system 100 to be installed on a line extension without the need for special housings. As will be discussed below, the non-pressure valve 104 may be configured as one integral receiver unit for coupling with a fuel nozzle.

Figure 2A:
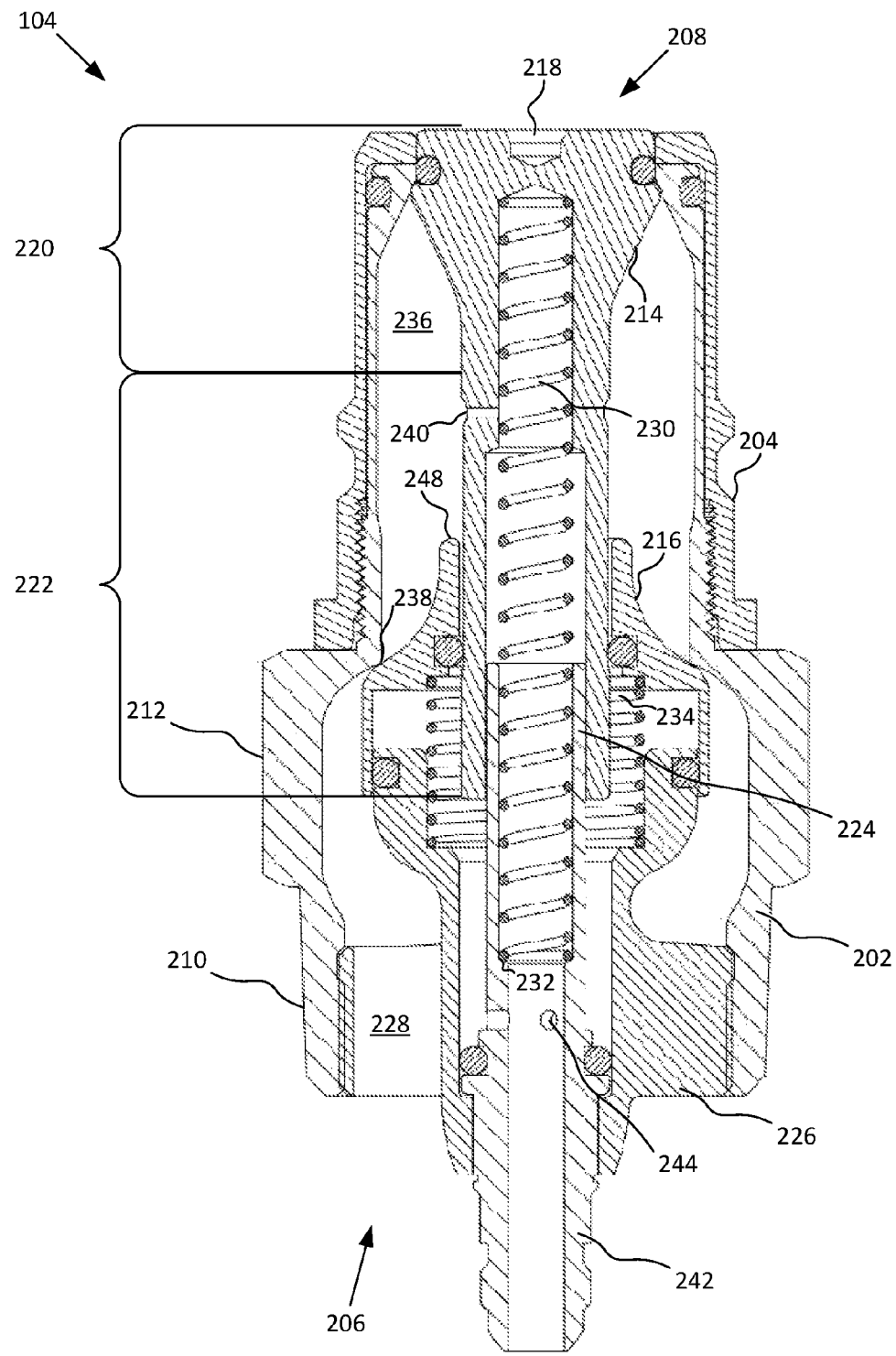
FIGS. 2a, 2b, and 2c are schematic cross-sectional view diagrams illustrating embodiments of the non-pressure valve in accordance with embodiments of the invention.
Figure 2B:
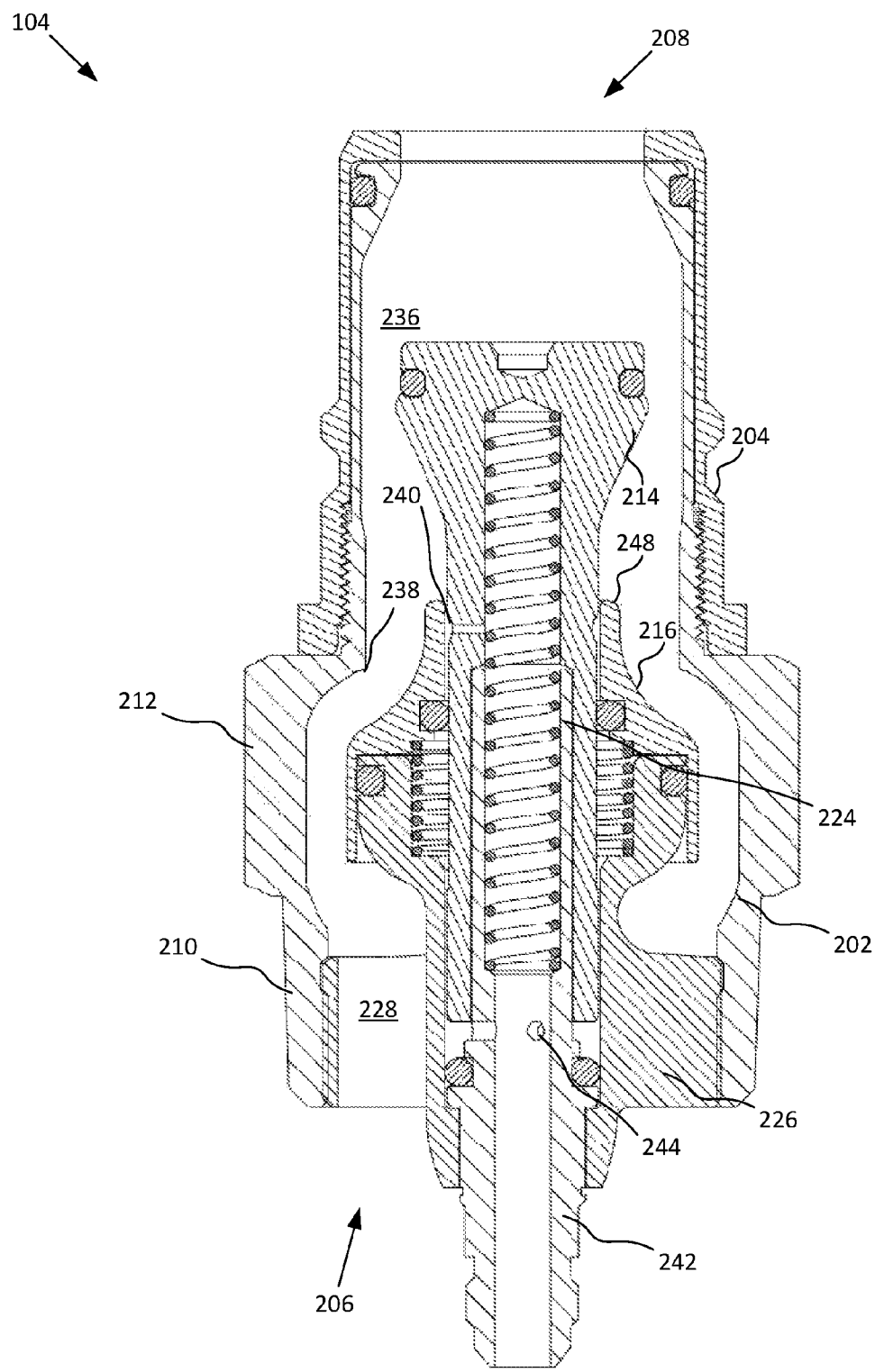
Figure 2C:
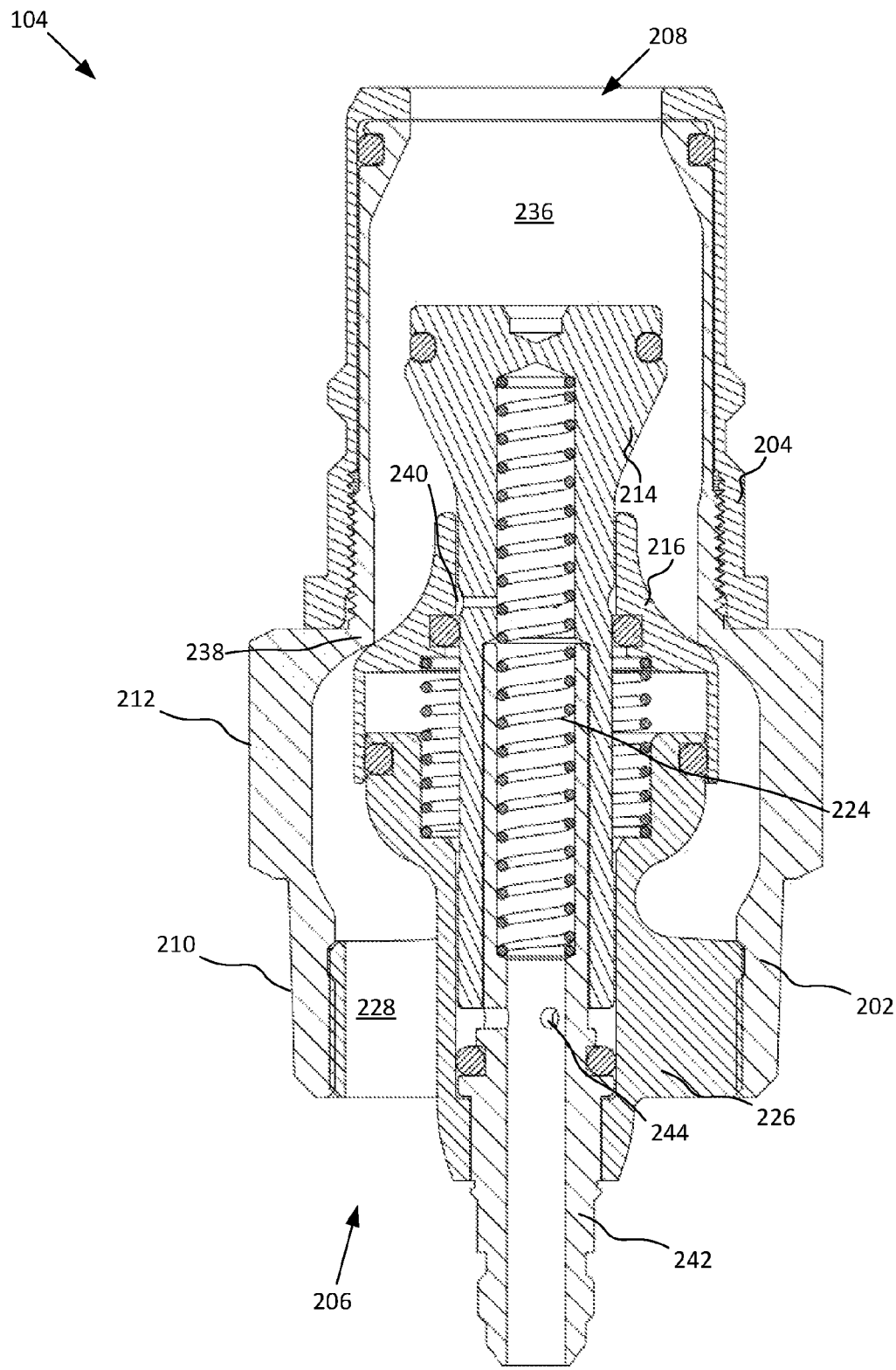

FIGS. 2a, 2b, and 2c are schematic cross-sectional view diagrams illustrating embodiments of the non-pressure valve 104 in accordance with embodiments of the invention. The non-pressure valve 104 is configured to operate in one of at least three modes. The three modes, closed mode, open mode, and shutoff mode, are depicted in the FIGS. 2a, 2b, and 2c, respectively. In a further embodiment, a partially open or closed mode is contemplated.

The non-pressure valve 104 in FIG. 2a is depicted in a closed configuration. The non-pressure valve 104, is a fuel receiver for connecting with a fuel nozzle (not shown). The non-pressure valve 104, in one embodiment, is formed having a base 202 and a removable sleeve 204 removably coupleable to the base 202. In another embodiment, the non-pressure valve 104 may be formed as a single unit, or in other words, the removable sleeve 204 may be formed as part of the base 202. The non-pressure valve 104 extends from a first inner end 206 (i.e., outlet) to a second outer end 208 (i.e., inlet). Generally, the non-pressure valve 104 is secured to a fuel tank such that the inner end 206 is in fluid communication with the fuel tank and the outer end 208 extends away from the fuel tank, as depicted above with reference to FIG. 1.

The base 202 includes a fuel tank attachment portion 210 and a head portion 212. Although not shown, the fuel tank attachment portion may include external threads configured to mate with internal threads formed in the fuel tank. The head portion 212 may be formed with a generally hexagonal shape, in a manner similar to a hexagonal nut fastener, such that tools such as wrenches may couple the non-pressure valve 104 to the fuel tank.

The non-pressure valve 104 includes a sliding valve assembly that is formed of a poppet 214 and a sliding bell 216. The poppet 214 is configured to slide from a closed position (see FIG. 2a) to an open position (see FIGS. 2b and 2c). The poppet 214 includes a nozzle guide 218 for receiving a portion of an actuating device, e.g., a fuel nozzle. The fuel nozzle (not shown) actuates the poppet 214 and slides the poppet 214 from the closed position to the open position. The poppet 214, generally, is cylindrical in shape with a closed-off head portion 220 and an open-ended lower portion 222. The lower portion 222 is configured to slideably engage a cylindrical bleed tube 224. The lower portion 222 is configured with an inner diameter greater than the outer diameter of the bleed tube 224 such that the lower portion 222 of the poppet 214 slides on the outside of the bleed tube 224. In an alternative embodiment, the lower portion 222 engages inner surfaces of the bleed tube 224.

The bleed tube 224, in one embodiment, is rigidly coupled with a sliding-valve support mount 226 (i.e., a support mount for a sliding valve). The support mount 226, or spider mount, is coupled with the fuel tank attachment portion 210 and has openings 228 for allowing the flow of fuel through the non-pressure valve 104. The openings 228 allow for the flow of fuel to exit the non-pressure valve 104 in a direction parallel to the direction of fuel flow that enters the non-pressure valve 104. This, beneficially, allows for the non-pressure valve 104 to be used in a hose, or other type of housing that would otherwise block exit of the fuel flow in a direction perpendicular to the inlet fuel flow.

The support mount 226, as depicted, may be formed with a profile that maximizes a flow path through the non-pressure valve while retaining enough structure to support the sliding bell 216 and the poppet 214. In one embodiment, the distance between an outer surface of the support mount 226 and an inner surface of the base 202 is in the range of between about 0.25" and 0.75." Stated differently, the distance is the width of the opening 228. In a further embodiment, the distance between the support mount 226 and the base 202 is determined according to a desired flow rate.

In one embodiment, a spring 230 may be disposed between the poppet 214 and the bleed tube 224. To maintain the position of the spring 230, the bleed tube 224 may include a spring stop 232. The spring stop 232 prevents the spring 230 from extending past the spring stop 232 while still allowing the flow of fuel through the bleed tube 224 as will be discussed in greater detail below. The spring 230 biases the poppet 214 and maintains the poppet 214 in the closed position poppet position as depicted in FIG. 2a. The springs 230, 234 apply forces to the poppet 214 and the sliding bell 216 that causes each to move in a direction toward the outer end 208. The strength of the springs is selected according to a desired actuation pressure.

The sliding bell 216 may be configured to engage the outer surfaces of both the poppet 214 and the support mount 226. The sliding bell 216 is also configured to slide independently of the poppet 214, but in a direction parallel to the direction of travel of the poppet 214. The sliding bell 216 and the poppet 214, in one embodiment, are not mechanically coupled such that the movement of one affects the other. Accordingly, the sliding bell 216 functions as a one-way valve, or anti-theft device to prevent the theft of fuel. Stated differently, even if the poppet 214 is actuated by some type of device, the sliding bell 216 will not allow fluid to pass from the storage tank to the inlet (or outer end 208) of the non-pressure valve (e.g., see FIG. 2c). The sliding bell 216, however, will actuate in the other direction with minimal force. That is to say, the sliding bell 216 will slide towards the outlet (or inner end 206) when a force (i.e., a fluid being supplied with a sufficient pressure) compresses a spring 234. O-rings may be positioned, as depicted, at the junctions between the moving components of the non-pressure valve 104 to prevent fuel leakage.

An inwardly facing surface of the base 202 defines an interior channel 236 through which fuel flows during a refueling event. The interior channel 236 extends from the inlet (or outer end 208) to the outlet (or inner end 206). The cross-sectional profile of the interior channel 236 includes a first straight section and a diverging section as the interior channel passes around the sliding bell 216 and the support mount 226.

When in a closed position (see FIGS. 2a and 2c), the sliding bell 216 engages a corresponding surface of the base 202. In the depicted embodiment, the corresponding surface is a shoulder 238. In alternative embodiments, the corresponding surface is configured as a step, or any other surface profile acceptable for forming a seal (or a substantial seal) between the base 202 and the sliding bell 216.

During the refueling process, an opposing plunger of a fueling nozzle contacts the poppet 214 and applies an inwardly directed force (i.e., a force directed towards the fuel tank) on the poppet 214. When the force generated by the nozzle is greater than the biasing force of the spring 230, the poppet 214 moves inwardly such that the seal between the poppet 214 and the non-pressure valve is broken and fuel is allowed to flow through the interior channel 236. The pressure of the fuel actuates the sliding bell 216 such that the interior channel is open from one end of the non-pressure valve 104 to the other (see FIG. 2b). As depicted, the poppet 214 and the sliding bell 216 are external to the fuel tank. In other words, both the poppet 214 and the sliding bell 216 are disposed within the portion of the non-pressure valve 104 that remains outside of the fuel tank.

As fuel passes through the interior channel 236, a small portion of fuel is diverted through a bleed opening 240 in the poppet 214. The bleed opening 240 allows fuel to pass into the bleed tube 224, through an outlet fitting 242 and into the hose 112 described above with reference to FIG. 1. In the depicted embodiment, the bleed opening 240 is oriented with an angle substantially perpendicular to the flow of fluid through the non-pressure valve 104. In alternative embodiments, the bleed opening is oriented at any angle.

When the poppet 214 is depressed, the bleed opening 240 is disposed within a collar 248 of the sliding bell 216. A gap between the collar 248 and the poppet 214 allows fuel to pass, but beneficially, is small enough to prevent debris from plugging the bleed opening 240. In one embodiment, the bleed opening 240 as a diameter in the range of between about 10 thousandths and 100 thousandths of an inch. In one embodiment, the poppet 214 is configured with three bleed openings 240 positioned radially with respect to each other. For example, the bleed openings 240 may be positioned at 120 degree angles. In alternative embodiments, the poppet 214 is provided with any number of bleed openings 240 as determined to allow a desired flow rate into the hose 112. The fuel then travels through the hose to the vent 110 as will be described in greater detail below.

Figure 3A:
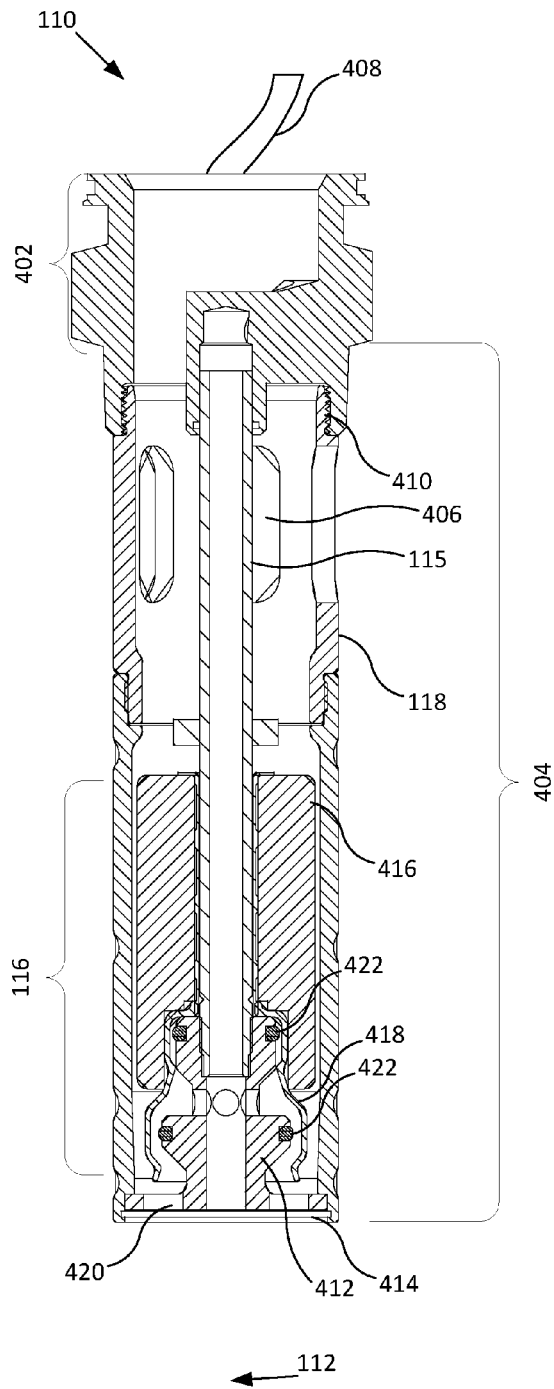
FIGS. 3a and 3b are side cross-sectional diagrams illustrating the vent in an open position (see FIG. 3a) and in a closed position (see FIG. 3b).
Figure 3B:
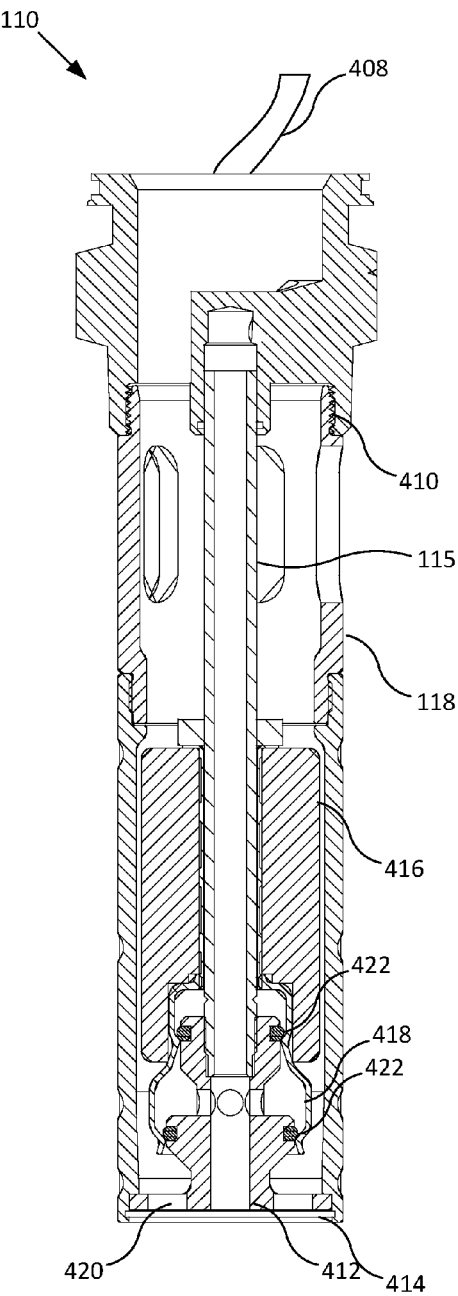

FIGS. 3a and 3b are side cross-sectional diagrams illustrating the vent 110 in an open position (see FIG. 3a) and in a closed position (see FIG. 3b). In the depicted embodiments, the vent 110 is formed, as described above with reference to FIG. 1, having an upper portion 402 positioned outside of the fuel tank, and a lower portion 404 positioned inside of the fuel tank. The upper portion 402 is fluidly connected with exhaust ports 406 built into the lower portion 404. Accordingly, as the fuel tank fills, air from the ullage area passes through the exhaust ports 406, into the upper portion 402, and into the atmosphere via a vent hose 408.

The lower portion 404, in one embodiment, includes a float shaft 118. The float shaft 118 is generally of a tubular configuration having a first opening that couples with the upper portion. As depicted, the float shaft 118 may be formed with a male threaded end 410 for attaching to a female threaded opening of the upper portion 402. Disposed within the float shaft 118 is the float tube 115. The float tube 115 is a tubular pipe with a first end fluidly coupled with the hose 112, and fluidly coupled with a poppet 412. The poppet 412 is disposed in the lower end of the float shaft 118, and may be secured with a spiral lock 414.

The float tube 115 slidably engages the float assembly 116. In one embodiment, the float assembly 116 includes a float 416 and a bell housing 418 coupled to one end of the float 416. The float assembly 116 is configured to move freely with respect to the float tube 115. In a default, or "open position" as depicted in FIG. 4a, the float assembly 116 rests on a bell guide 420. Fuel flows into the area between the bell housing 418 and poppet 412, and then back into the tank via openings in the bell guide.

The poppet 412, in one embodiment, is formed with O-rings 422 for forming a seal between the poppet 412 and the bell housing 418 when in "closed position" (see FIG. 4b). The void, or space between the poppet 412 and the bell housing 418 is selected to allow the free flow of fuel from the hose 112. In one embodiment, the flow rate of the hose is in the range of between about 1 and 3 gallons per minute, when the distance between the poppet 412 and the bell housing 418, at the narrowest point, is in the range of between about 0.05 and 0.5 inches and the diameter of the poppet 412 is in the range of between about 0.5 and 2 inches.

Once the fuel in the fuel tank rises to a level where the float 416 begins to rise, the distance between the widest portion of the poppet 412 and the bell housing 418 begins to narrow. Accordingly, the fuel flow begins to be impeded, and the pressure of the fuel begins to increase and push upward on the bell housing 418. Almost instantaneously, the bell housing 418 transitions to the closed position depicted in FIG. 4b, and fuel flowing through the float tube 115 is stopped. As described above, the backpressure that results is communicated with the non-pressure valve described above with reference to FIGS. 2a, 2b, and 2c, and the non-pressure valve shuts off the fuel flow. In particular, the backpressure in the line 112 causes fuel to flow through openings 244 in the outlet fitting 242 into a void 246 disposed between the support mount 226 and the bleed tube 224. The fuel pressure, in one embodiment, begins to push on an interior surface 246 of the sliding bell 216. The fuel pressure, together with the spring 234, is sufficient to overcome the pressure of fuel from the fuel nozzle, and the sliding bell 216 seals the interior channel 236 to stop the flow of fuel.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Furthermore, the details, including the features, structures, or characteristics, of the subject matter described herein may be combined in any suitable manner in one or more embodiments. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-pressure valve comprising:
a tubular housing having an inlet and an outlet;
a flow-through support mount disposed in the outlet;
a first poppet slideably coupled with the flow-through support mount and extending towards the inlet, where the first poppet is moveable between an open position that allows a fluid to flow through the inlet and a closed position that blocks the fluid from flowing through the inlet;
an outlet fitting extending through the flow-through support mount and the first poppet, the outlet fitting forming a slide guide for the first poppet; and
a sliding bell disposed around a portion of the first poppet and configured to slide independently of the first poppet, where the sliding bell is moveable between an open position that allows the fluid to flow through the non-pressure valve and a closed position that blocks the fluid from flowing through the non-pressure valve, and where the sliding bell moves from the open position to the closed position in response to an increase in backpressure in a hose coupled with the outlet fitting.

2. The non-pressure valve of claim 1, where the flow-through mount comprises a second poppet extending toward the inlet.

3. The non-pressure valve of claim 1, further comprising a bleed opening in the first poppet configured to allow fuel to pass from the inlet into the outlet fitting through an interior channel in the first poppet.

4. The non-pressure valve of claim 3, where a collar of the sliding bell covers the bleed opening when the first poppet is in the open position.

5. The non-pressure valve of claim 4, further comprising an opening formed between the first poppet and the sliding bell to allow fluid to flow into the bleed opening even when the sliding bell covers the bleed opening.

6. The non-pressure valve of claim 1, where the sliding bell is a one-way valve that only allows the flow of fluid from the inlet to the outlet of the non-pressure valve.

7. The non-pressure valve of claim 1, further comprising a first spring disposed between the first poppet and the flow-through support mount configured to bias the first poppet.

8. The non-pressure valve of claim 1, further comprising a second spring disposed between the sliding bell and the flow-through support mount configured to bias the sliding bell.

* * * * *